United States Patent [19]

Hahn

[11] Patent Number: 5,112,070
[45] Date of Patent: May 12, 1992

[54] DUAL WHEEL PULLER/DOLLY

[76] Inventor: Kevin C. Hahn, 247 Commack Rd., Mastic Beach, N.Y. 11951

[21] Appl. No.: 620,345

[22] Filed: Nov. 29, 1990

[51] Int. Cl.⁵ .......................... B62B 1/00; B60B 29/00
[52] U.S. Cl. .................. 280/79.4; 414/429; 29/244
[58] Field of Search .............. 280/79.4; 414/429, 430; 29/244, 252, 258, 259; 254/106, 107

[56] References Cited

U.S. PATENT DOCUMENTS

| | | | |
|---|---|---|---|
| 2,323,144 | 6/1943 | Long | 254/106 |
| 2,718,253 | 9/1955 | Zinke | 254/106 |
| 2,812,086 | 11/1957 | Kuenzi | 414/429 |
| 3,160,393 | 12/1964 | Councilman | 414/429 |
| 3,689,978 | 9/1972 | Kelso | 29/259 |
| 4,692,082 | 9/1987 | Smith | 414/429 |
| 4,976,449 | 12/1990 | Lotspeich et al. | 280/79.4 |

FOREIGN PATENT DOCUMENTS 2301397  9/1976  France ...................... 414/429

Primary Examiner—Charles A. Marmor
Assistant Examiner—Kevin Hurley
Attorney, Agent, or Firm—Richard L. Miller

[57] ABSTRACT

A dual wheel puller/dolly is provided and consists of a pair of mobile elongated frame members with an elongated rod extending transversely therebetween and a jack mechanism cooperative with the rod. An elongated roller is rotatively mounted onto the top of each frame member to engage with a pair of large heavy motor vehicle wheels. When the jack mechanism is operated the large heavy wheels will be lifted upwardly to be moved about. One of the elongated frame members can also be used with other components, such as a pair of chains and a socket, as a wheel hub puller so as to facilitate the removal of a wheel bearing therefrom.

1 Claim, 2 Drawing Sheets

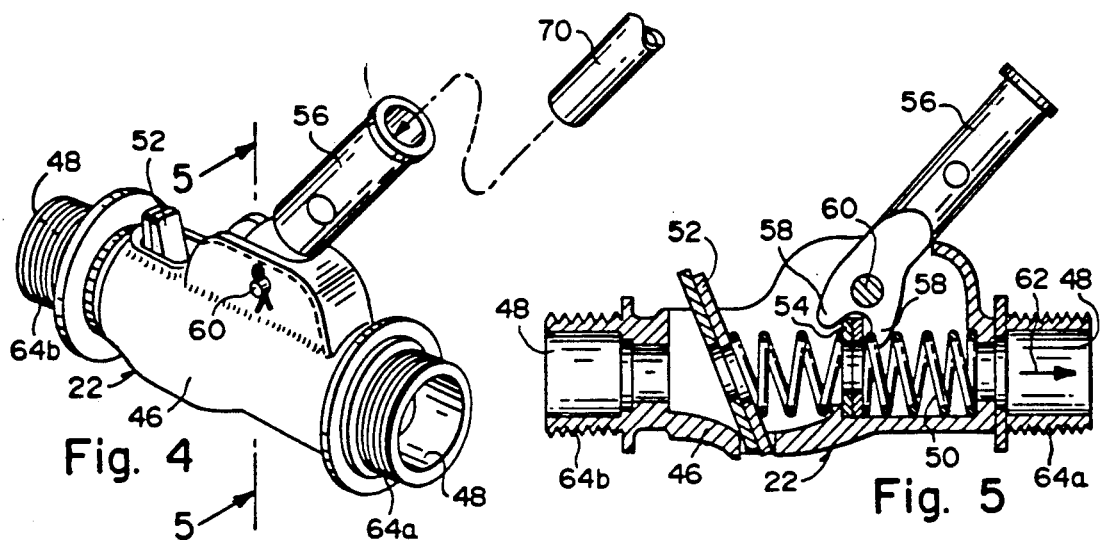
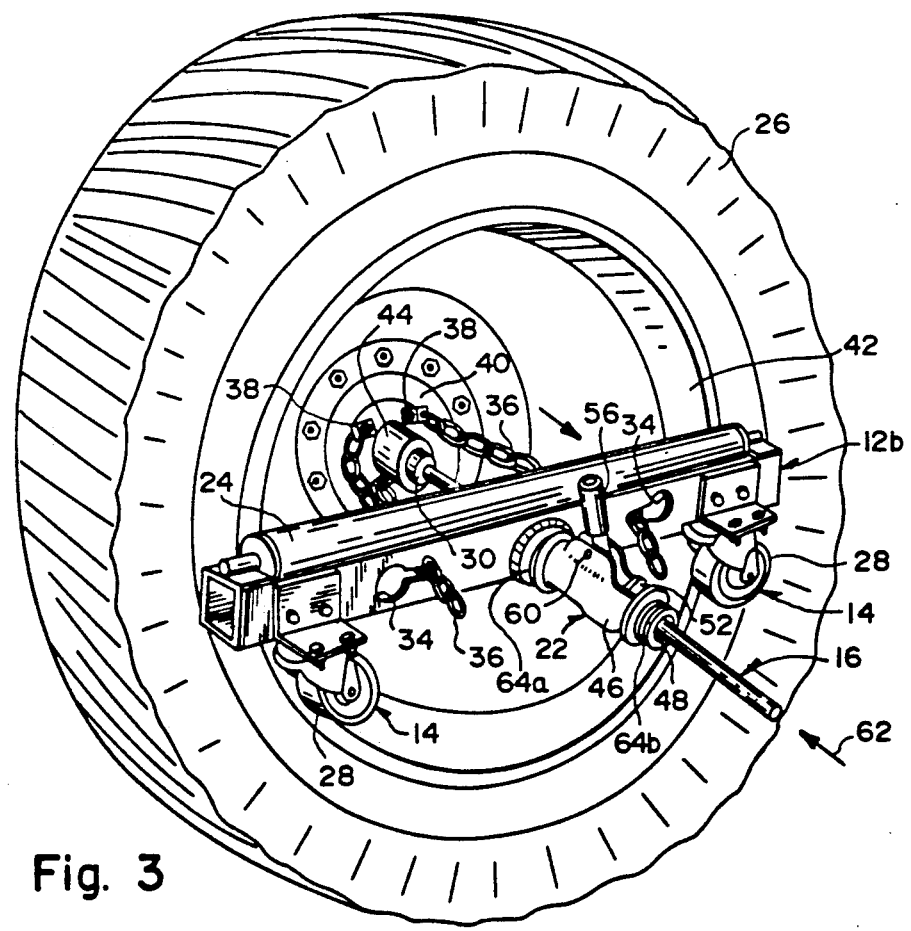

DUAL WHEEL PULLER/DOLLY

BACKGROUND OF THE INVENTION

The instant invention relates generally to automotive wheel accessories and more specifically it relates to a dual wheel puller/dolly.

Numerous automotive wheel accessories have been provided in the prior art that are adapted to be utilized by a person so that the wheels on motor vehicles can be properly maintained and repaired. While these units may be suitable for the particular purpose to which they address, they would not be as suitable for the purpose of the present invention as hereafter described.

SUMMARY OF THE INVENTION

A primary object of the present invention is to provide a dual wheel puller/dolly that will overcome the shortcomings of the prior art devices.

Another object is to provide a dual wheel puller/dolly that in one instance can be used as a wheel puller to apply a force to a motor vehicle wheel hub, causing the wheel hub to move toward the source of the force, so as to remove a wheel bearing therefrom.

An additional object is to provide a dual wheel puller/dolly that in another instance can be used as a wheel dolly to move a pair of large heavy motor vehicle wheels about.

A further object is to provide a dual wheel puller/dolly that is simple and easy to use.

A still further object is to provide a dual wheel puller/dolly that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 3 is a perspective view illustrating the instant invention being used as a wheel puller;

FIG. 4 is a perspective view of the jacking mechanism per se; and

FIG. 5 is a cross sectional view taken on line 5—5 of FIG. 4.

DETAILED DESCRIPTION OF THE PREFERRED EMBODIMENTS

Figure 2:
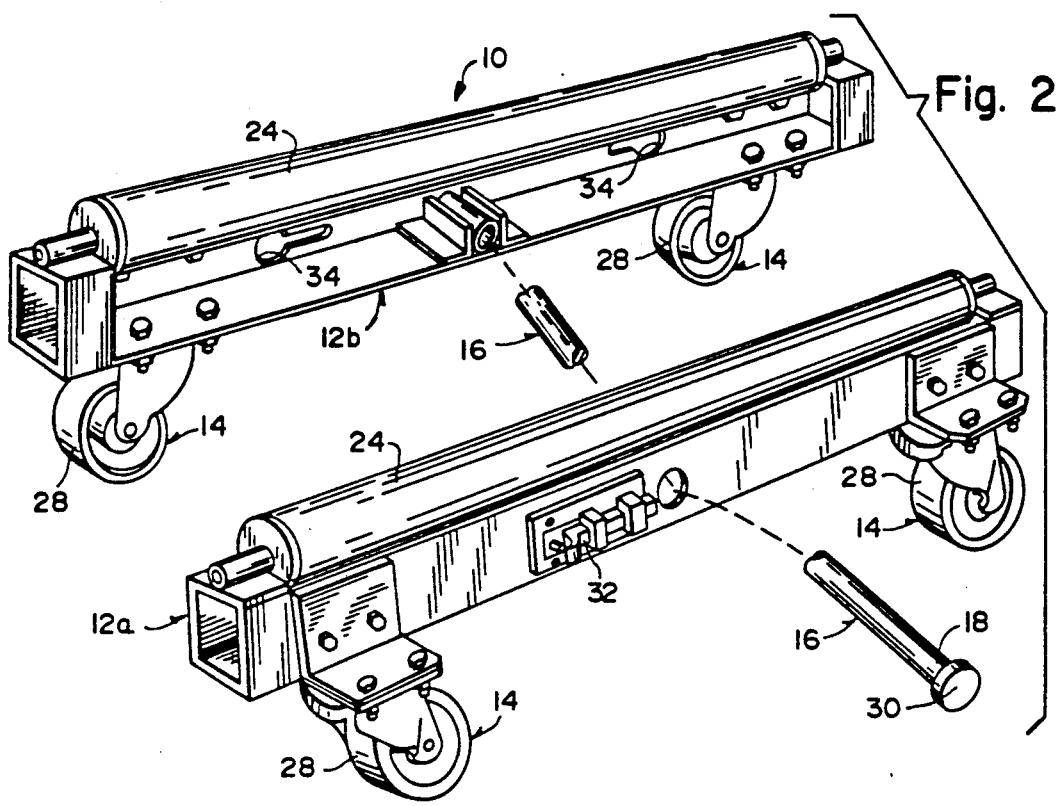
FIG. 2 is a perspective view showing some of the components shown in FIG. 1 from the opposite side, separated from each other and with parts broken away.
Figure 1:
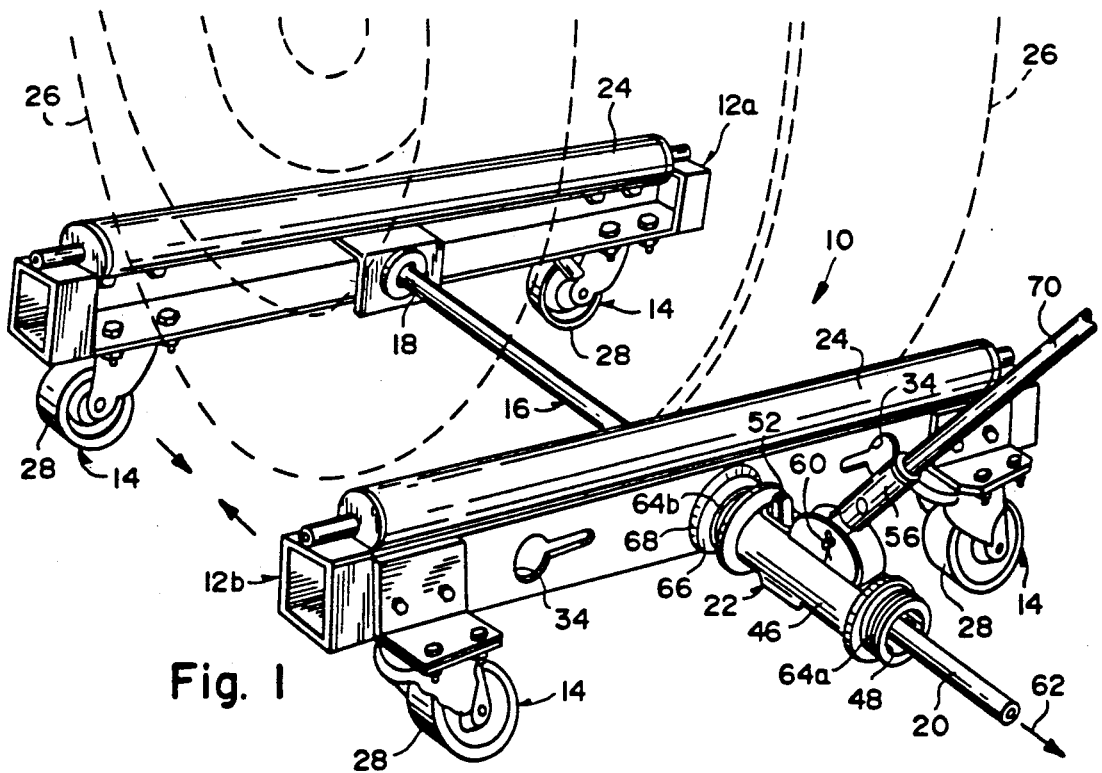
FIG. 1 is a perspective view of the instant invention shown being used as a dolly lifting a pair of wheels in phantom ready for removal or installation on a motor vehicle.

Turning now descriptively to the drawings, in which like reference characters denote like elements throughout the several views, FIGS. 1 and 2 illustrates a dual wheel puller dolly 10 consisting of a pair of elongated frame members 12a and 12b with a mechanism 14 on the bottom of each frame member 12 for making the frame members 12 mobile about a flat surface. An elongated rod 16 extends transversely between the frame members 12a and 12b so that a first end 18 of the rod 16 is retained in the first frame member 12a while a second end 20 of the rod 16 extends outwardly through the second frame member 12b. A jack mechanism 22, as best seen in FIGS. 4 and 5, is cooperating with the second end 20 of the rod 16 to bear against the second frame members 12b. A pair of elongated rollers 24 are each rotatively mounted to the top of each frame members 12a and 12b to engage with the bottom of a pair of large heavy motor vehicles wheels 26, shown in phantom in FIG. 1. When the jack mechanism 22 is operated the rod 16 will be pulled forcing the frame members 12a and 12b to move towards each other and the elongated rollers 24 to lift the large heavy motor vehicle wheels 26 upwardly away from the flat supporting floor surface so that the entire assembly that is the puller/dolly with the dual wheels resting thereon may be freely moved about the floor's surface.

The mobile mechanism 10 includes four casters 28 two of which are each spaced apart and affixed to the bottom of each frame members 12a and 12b. A large head 30 is formed on the first end 18 of the elongated rod 16, so as to be held to the first frame members 12a. A latch mechanism 32 on the first frame member 12a slideably engages with the large head 30 on the elongated rod 16 to retain the large head 30 thereto.

The second frame members 12b has a pair of spaced apart keyhole shaped apertures 34 therethrough. A pair of chains 36, as shown in FIG. 3, are each affixed at one end 38 to a hub 40 of one of the large heavy motor vehicle wheels 26 and at other end to one of the keyhole shaped apertures 34 in the second frame members so that the second frame member 12b can bear against the wheel rim 42, while the first frame member 12a is removed and not used. A socket typically borrowed from a conventional socket wrench set of appropriate size 44 is placed between an end of the elongated rod 16, so that when the jack mechanism 22 is operated the rod 16 will be pushed against the socket 44, causing the wheel hub 40 to be pulled loose by the chains 36 thereby allowing a wheel bearing (not shown) to be removed therefrom.

The jack mechanism 22 is of a mechanical type and includes a housing 46 with a bore 48 at each end, springs 50 with a release trigger 52, and a movable grabbing members 54 are retained within the housing 46. A handle sleeve 56 sized to receive a removable handle 70, having ears 58 is pivotally mounted in the housing 46 at 60 so that the ears 58 will engage with the movable grabbing member 54 so that when the handle 56 pivots the rod 16 will be forced to move in one direction as indicated by arrow 62 and best seen FIGS. 1, 3 and 5. Two externally threaded shanks 64a and 64b are integrally attached to the opposite ends of housing 46 for removable attaching the jack mechanism 22 in either of two orientation to a mating internally thread bushing 66 which is fixedly secured typically by a weld 68 to the second frame members 12b.

To use the instant invention 10 as a puller, a person must first lift the motor vehicle with an independent jack and then utilize the components as shown and described above in FIG. 3, with the jack mechanism 22 having thread shank 64a thread into bushing 66. To use the instant invention 10 as a dolly, the person must then utilize the components as shown and described above in FIGS. 1 and 2, but instead with the jack mechanism 22 having thread shank 64b thread into bushing 66.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A dual wheel puller/dolly for causing a wheel hub to be pulled loose from a vehicle which comprises:

a) a pair of elongated frame members;

b) means on a bottom of each frame member, for making said frame members mobile about a flat supporting floor surface, wherein said mobile means includes four casters, two each of which are spaced apart and affixed respectively to the bottom of each said frame member;

c) an elongated rod, extending transversely between said frame members, having a large head formed on the first end of said elongated rod so as to be held to said first frame member, so that a first end of said rod is retained in said first frame member, while a second end of said rod extends outwardly through said second frame member and a latch mechanism on said first frame member to slideably engage with said large head on said elongated rod to retain said large head thereto;

d) a jack mechanism, removably securable to said second frame member for cooperatively pulling on the second end of said rod;

e) a pair of elongated rollers, each rotatively mounted to the top of each said frame member, to engage with a lower peripheral surfaces of a large heavy motor vehicle dual pair of wheels, so that when said jack mechanism is appropriately orientated with respect to said second frame member and operated, said rod will be pulled allowing said frame members to move towards each other, so that and said elongated rollers will lift the large heavy motor vehicle dual pair of wheels upwardly away from the flat supporting floor surface to be moved about, when said pair of wheels have been removed from said vehicle;

f) said second frame member having a pair of spaced apart keyhole shaped apertures therethrough;

g) a pair of chains, each affixable at one end to a hub of one of the large heavy motor vehicle wheels and at other end to one of said keyhole shaped apertures in said second frame members, so that when said first frame member is removed and not used, said second frame member can bear against the wheel rim;

h) a socket to be placed between the end of said elongated rod and the wheel hub; and i) said jack mechanism orientated with said second frame member, so that when said jack mechanism is operated said rod will be pushed against said socket causing the wheel hub to be pulled loose by said chains, thereby facilitating the removal of a wheel bearing therefrom.

* * * * *